US012592051B2

(12) United States Patent
Zhao et al.

(10) Patent No.: US 12,592,051 B2
(45) Date of Patent: \*Mar. 31, 2026

(54) OPTIMIZATION OF EYE CAPTURE CONDITIONS FOR EACH USER AND USE CASE

(71) Applicant: Sony Interactive Entertainment Inc., Tokyo (JP)

(72) Inventors: Frank Zhao, San Mateo, CA (US); Koichi Obana, San Mateo, CA (US); Yuichiro Nakamura, San Mateo, CA (US)

(73) Assignee: Sony Interactive Entertainment Inc., Tokyo (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 18/809,196

(22) Filed: Aug. 19, 2024

(65) Prior Publication Data

US 2025/0086919 A1 Mar. 13, 2025

Related U.S. Application Data

(63) Continuation of application No. 18/296,226, filed on Apr. 5, 2023, now Pat. No. 12,112,511.

(51) Int. Cl.
| | |
|---|---|
| *G06V 10/141* | (2022.01) |
| *G06F 3/01* | (2006.01) |
| *G06V 40/19* | (2022.01) |
| *H04N 23/73* | (2023.01) |
| *H04N 23/74* | (2023.01) |

(52) U.S. Cl.
CPC ............ *G06V 10/141* (2022.01); *G06F 3/012* (2013.01); *G06F 3/013* (2013.01); *G06V 40/19* (2022.01); *H04N 23/73* (2023.01); *H04N 23/74* (2023.01)

(58) Field of Classification Search
CPC ........ H04N 23/73; H04N 23/74; G06V 40/19; G06V 10/141; G06F 3/013; G06F 3/012
See application file for complete search history.

(56) References Cited

U.S. PATENT DOCUMENTS

| | | | |
|---|---|---|---|
| 9,230,473 B2 | 1/2016 | Margolis et al. | |
| 10,156,900 B2 | 12/2018 | Publicover et al. | |
| 10,990,816 B1 * | 4/2021 | Fix ......................... | G06T 7/246 |

(Continued)

FOREIGN PATENT DOCUMENTS

| | | |
|---|---|---|
| JP | 2000342846 A | 12/2000 |
| JP | 2015012592 A | 1/2015 |

(Continued)

OTHER PUBLICATIONS

Machine translation of JP2000-342846.

(Continued)

*Primary Examiner* — Vinh T Lam

(74) *Attorney, Agent, or Firm* — Kilpatrick Townsend & Stockton LLP

(57) ABSTRACT

Techniques for optimizing which LEDs in a HMD to use, the brightness of those LEDs, and camera exposure are divulged based on the particular function to be performed. For instance, one set of optimization parameters may be implemented for eye tracking purposes while a different set of optimization parameters may be implemented for eye-based authentication purposes.

20 Claims, 9 Drawing Sheets

(56)                References Cited

U.S. PATENT DOCUMENTS

| | | | |
|---|---|---|---|
| 11,238,143 B2 * | 2/2022 | Fletcher | G06V 40/197 |
| 11,334,154 B2 | 5/2022 | Cohen | |
| 11,435,857 B1 * | 9/2022 | Wu | G06F 1/1686 |
| 11,568,562 B1 | 1/2023 | D'amico | |
| 11,854,148 B2 * | 12/2023 | Ghatak | G06Q 30/0255 |
| 11,947,122 B1 * | 4/2024 | Golovanov | G06F 3/012 |
| 11,947,735 B2 * | 4/2024 | Lohse | G06F 3/0325 |
| 11,948,043 B2 * | 4/2024 | Kurz | G06T 7/70 |
| 11,966,045 B2 * | 4/2024 | Ollila | G06F 3/013 |
| 11,995,244 B2 * | 5/2024 | Bradski | H04N 21/414 |
| 12,101,549 B2 * | 9/2024 | Shroff | H04N 23/65 |
| 12,105,280 B2 * | 10/2024 | Petljanski | G02B 27/0172 |
| 12,124,624 B2 * | 10/2024 | Boyle | G02B 27/0093 |
| 12,154,382 B2 * | 11/2024 | Wang | G02B 27/017 |
| 12,182,323 B2 * | 12/2024 | Tornéus | G06F 1/3287 |
| 12,192,611 B2 * | 1/2025 | Shimazu | H04N 23/56 |
| 2007/0157173 A1 | 7/2007 | Klein et al. | |
| 2010/0197401 A1 | 8/2010 | Altshuler et al. | |
| 2014/0301573 A1 | 10/2014 | Kiely et al. | |
| 2014/0334630 A1 | 11/2014 | Harel | |
| 2021/0365533 A1 * | 11/2021 | Kaplan | G02B 27/0101 |
| 2021/0375257 A1 | 12/2021 | Tajik et al. | |
| 2023/0055268 A1 * | 2/2023 | Fix | G06V 40/193 |
| 2025/0220293 A1 * | 7/2025 | Yamazaki | H04N 23/74 |

FOREIGN PATENT DOCUMENTS

| | | |
|---|---|---|
| WO | 2015002238 A1 | 1/2015 |
| WO | 2022066814 A1 | 3/2022 |

OTHER PUBLICATIONS

Machine translation of JP2015-012592.
Protools for Game Audio (downloaded from Archive.org and as available 2018) (Year: 2018).
Protools Reference Guide (Year: 2019).
Wavosaur user manual (Year: 2008).
Wwise: The Wwise Project Adventure Handbook (Year: 2014).
Wwise: Wwise blog entry dated Apr. 2, 19 (Year: 2019).
Wwise: Wwise Fundamentals (Year: 2012).
PCT/US2024/023121, "International Search Report and Written Opinion", Jul. 2, 2024, 10 pages.

* cited by examiner

Authentication

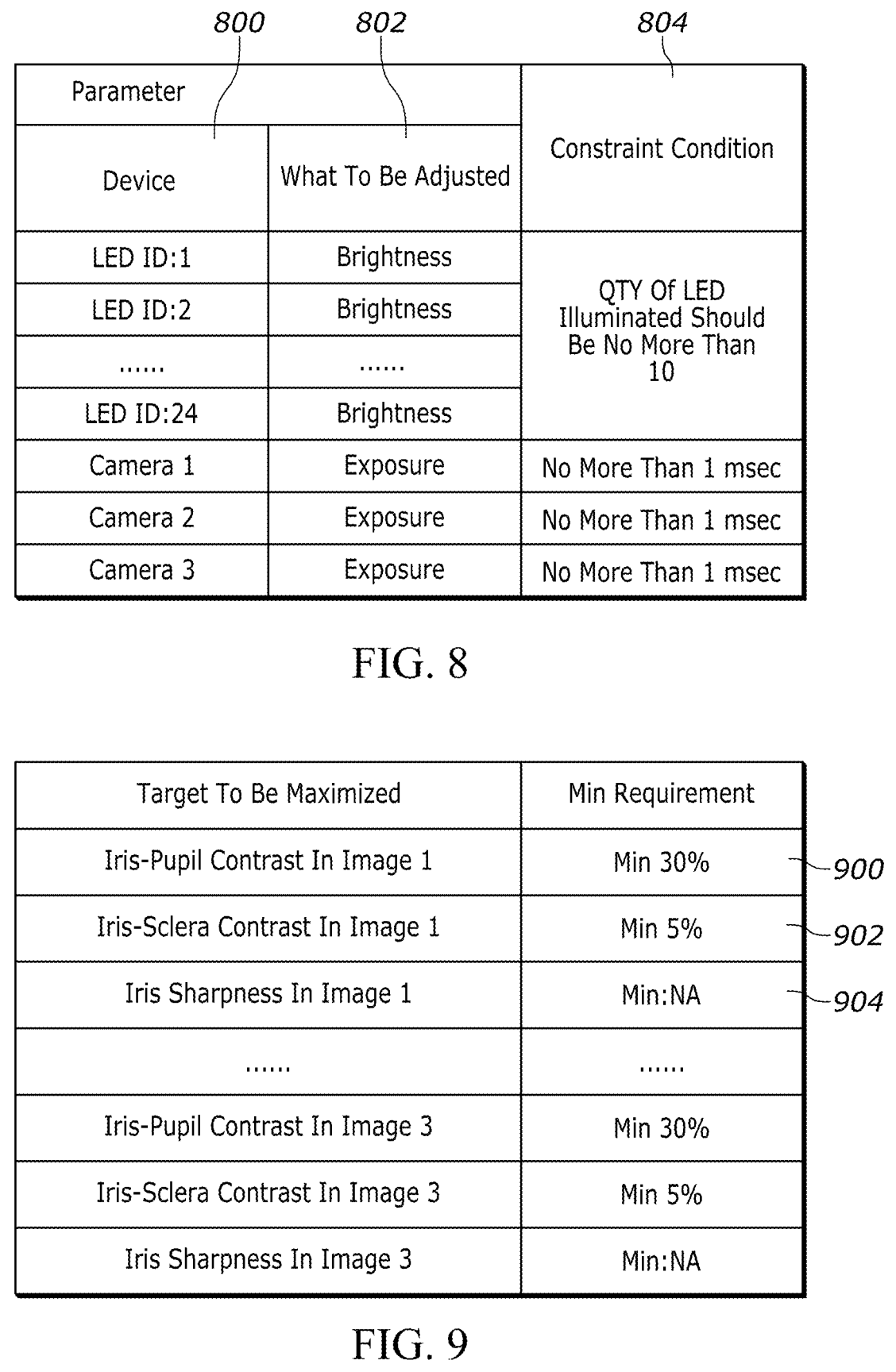

|          | 800 | 802 | 804 |
| Parameter | | | Constraint Condition |
|--- |--- |--- |--- |
| | Device | What To Be Adjusted | Constraint Condition |
| LED ID:1 | Brightness | QTY Of LED Illuminated Should Be No More Than 10 |
| LED ID:2 | Brightness | |
| ...... | ...... | |
| LED ID:24 | Brightness | |
| Camera 1 | Exposure | No More Than 1 msec |
| Camera 2 | Exposure | No More Than 1 msec |
| Camera 3 | Exposure | No More Than 1 msec |

FIG. 8

| Target To Be Maximized | Min Requirement | |
|--- |--- |--- |
| Iris-Pupil Contrast In Image 1 | Min 30% | ~900 |
| Iris-Sclera Contrast In Image 1 | Min 5% | ~902 |
| Iris Sharpness In Image 1 | Min:NA | ~904 |
| ...... | ...... | |
| Iris-Pupil Contrast In Image 3 | Min 30% | |
| Iris-Sclera Contrast In Image 3 | Min 5% | |
| Iris Sharpness In Image 3 | Min:NA | |

FIG. 9

Face Tracking

1200 — ID User

1202 — For Demanded Function, Do

1204 — Retrieve Best Parameter For That User

1206 — Implement In HMD

1208 — Execute Demanded Function

1300 — For Each LED, Do

1302 — Modulate LED

1304 — Glint?

No

Yes

1306 — Record For LED

1310 — Next LED

OPTIMIZATION OF EYE CAPTURE CONDITIONS FOR EACH USER AND USE CASE

FIELD

The present application relates generally to techniques for the optimization of eye capture conditions for each user and use case.

BACKGROUND

Images from the eyes of a person such as a person wearing a head-mounted device or display (HMD) for purposes of, e.g., playing a computer simulation are used for one or more computer-centric purposes, including personal authentication and eye tracking used in rendering the computer simulation on a display such as a HMD.

SUMMARY

As understood herein, optimum eye illumination varies depending on the demanded function. For instance, glint from the eye is helpful for eye tracking but can detract from authentication. Also, present techniques are help for people wearing glasses because sometimes they reflect the light too much depending on the lenses and that distracts eye tracking or authentication. With this method, the situation can be improved.

Accordingly, a system includes at least one computer medium that is not a transitory signal and that in turn includes instructions executable by at least one processor to establish a first set of parameters in a head-mounted device (HMD) for a first function, and establish a second set of parameters in the HMD for a second function. The parameters include at least light source brightness for illuminating an eye of a wearer of the HMD and an identity of which light sources in the HMD to use. The first function includes authentication.

If desired, the second function can include eye tracking or face tracking.

In some embodiments, the parameters can also include exposure time of at least one camera from whence the instructions are executable to receive at least one image of the eye. The instructions may be executable to correlate the first and second parameters to a first user. In example embodiments the instructions are executable to select which set of parameters to implement in the HMD based on a demanded function and then execute the demanded function.

In non-limiting embodiments the instructions can be executable to, responsive to a demand for eye tracking, illuminate at least a first light source that causes a glint from an eye, and responsive to a demand for authentication, illuminate at least a second light source that causes no glint from the eye.

In non-limiting embodiments the instructions can be executable to, responsive to a demand for eye tracking, illuminate at least a first light source with no light diffuser positioned between the light source and an eye, and responsive to a demand for authentication, illuminate at least a second light source with at least one light diffuser positioned between the light source and the eye.

In another aspect, a method includes establishing a first brightness for a first light source in a head-mounted device (HMD) for a first function, and establishing a second brightness for a second light source in the HMD for the first function. The method further includes establishing a third brightness for the first light source for a second function and establishing a fourth brightness for the second light source for the second function. The method includes, responsive to a demand for the first function, illuminating the first and second light sources at the first and second brightnesses, respectively. The method also includes, responsive to a demand for the second function, illuminating the first and second light sources at the third and fourth brightnesses, respectively.

In another aspect, an apparatus includes at least one processor programmed with instructions to execute A, or B, or both A and B. In this aspect, "A" includes responsive to a demand for eye tracking, illuminate at least a first light source that causes a glint from an eye, and responsive to a demand for authentication, illuminate at least a second light source that causes no glint from the eye. In this aspect, "B" includes responsive to a demand for eye tracking, illuminate at least a first light source with no light diffuser positioned between the light source and an eye, and responsive to a demand for authentication, illuminate at least a second light source with at least one light diffuser positioned between the light source and the eye.

The details of the present application, both as to its structure and operation, can be best understood in reference to the accompanying drawings, in which like reference numerals refer to like parts, and in which:

BRIEF DESCRIPTION OF THE DRAWINGS

FIGS. 8 and 9 are tables amplifying on the description of FIG. 7;

DETAILED DESCRIPTION

Figure 1:
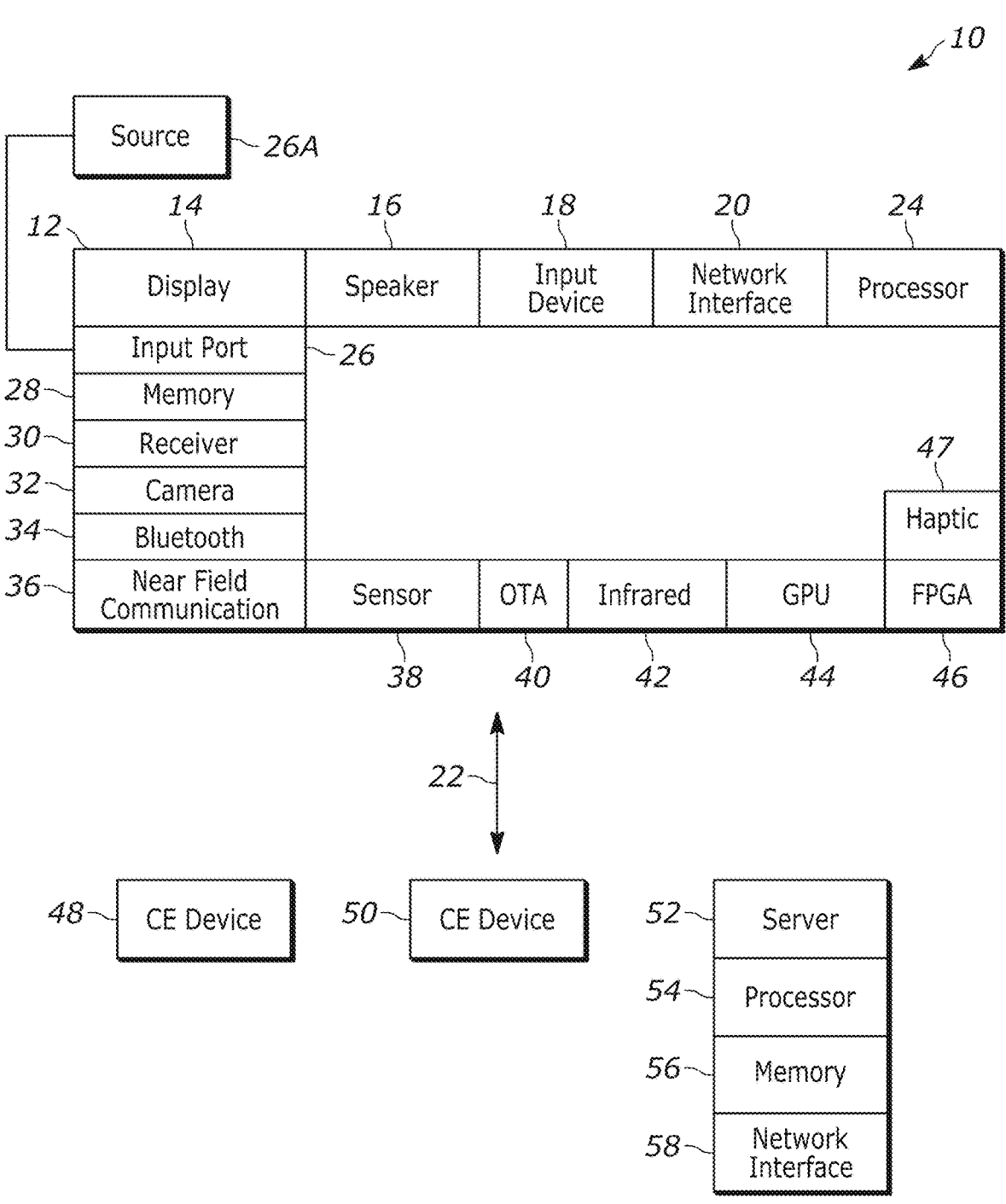
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
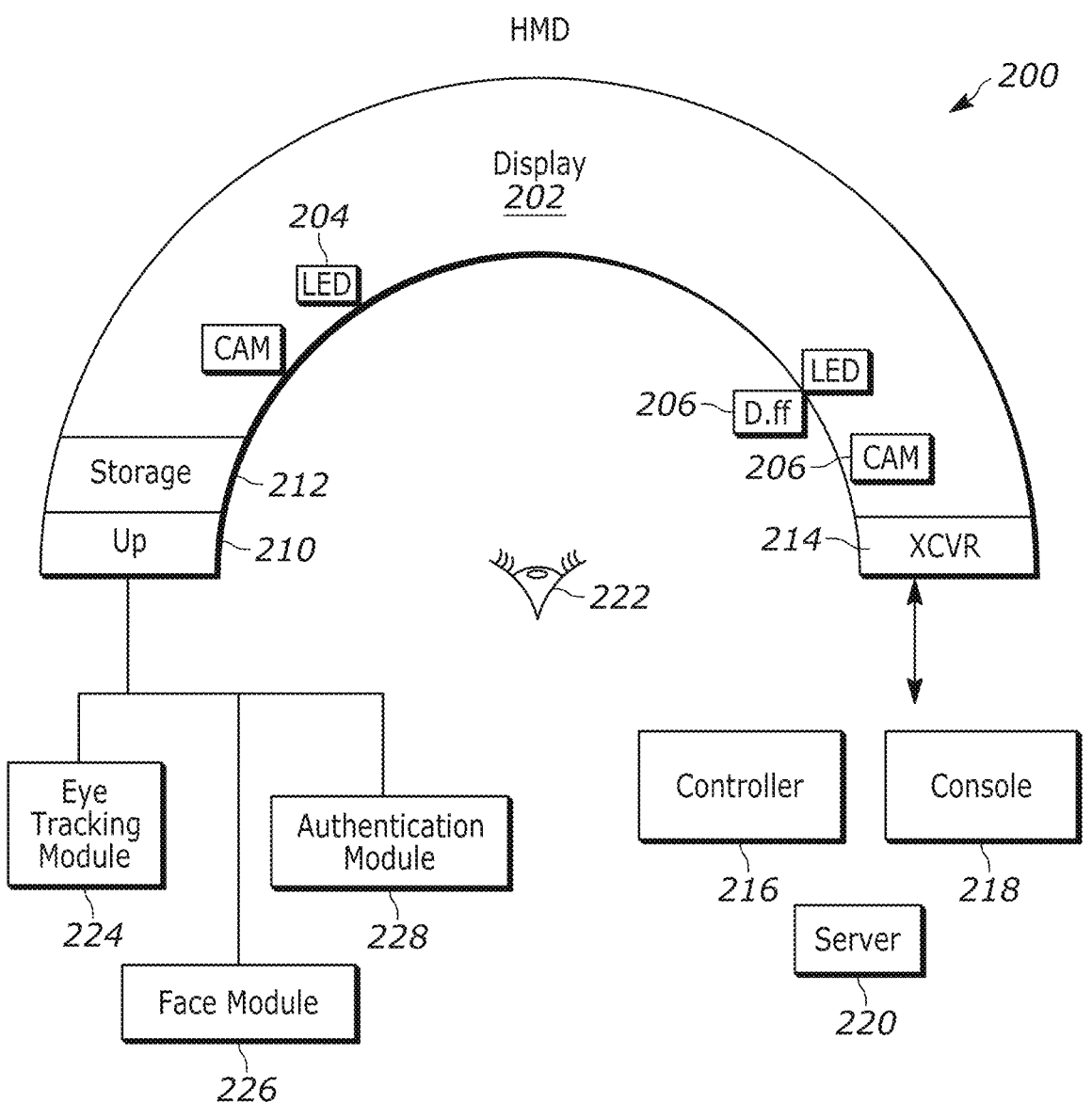
FIG. 2 illustrates a block diagram of a head-mounted device (HMD) consistent with present principles.

Turning to FIG. 2, an extended reality (XR) headset 200 is shown configured as goggles or glasses. The XR headset 200 may be for augmented reality (AR), virtual reality (VR), or mixed reality (MR). The headset 200 includes one or more display elements 202, one or more light sources 204 such as light emitting diodes (LED), and one or more cameras 206. One or more the LEDs may have diffusers 208 associated with them, e.g., embodied as a movable film to diffuse light from the LED. One or more processors 210 may access instructions on one or more computer storages 212 to execute principles herein, and may communicate with other devices and networks through one or more wireless transceiver 214. For example, the headset 200 may communicate with a computer simulation controller 216 such as a computer game controller, and/or a computer simulation console 218 such as a computer game console, and/or a computer simulation streaming server 220.

As discussed further herein, present principles optimize illumination of the light sources 204 and exposure of the cameras 206 for the particular wearer 222 of the headset and for the particular task. In FIG. 2, the tasks are represented by modules accessible to the processor 210, including an eye tracking module 224, a face tracking module 226, and an authentication module 228 to optimize performance regardless of the task.

In this way, using techniques described herein individual difference (color of iris, skin, physique, etc.) between users can be accounted for. The performance for each use case (task) can be maximized, and aging of an LED can be accounted for by repeating the tests described herein over the life of the headset. The brightness of each light source can be individually adjusted to optimize performance based on the user case (task). Light sources can be individually used or not for any given task depending on optimization. Camera exposures also may be varied as needed to optimize performance for a given task.

Figure 3:
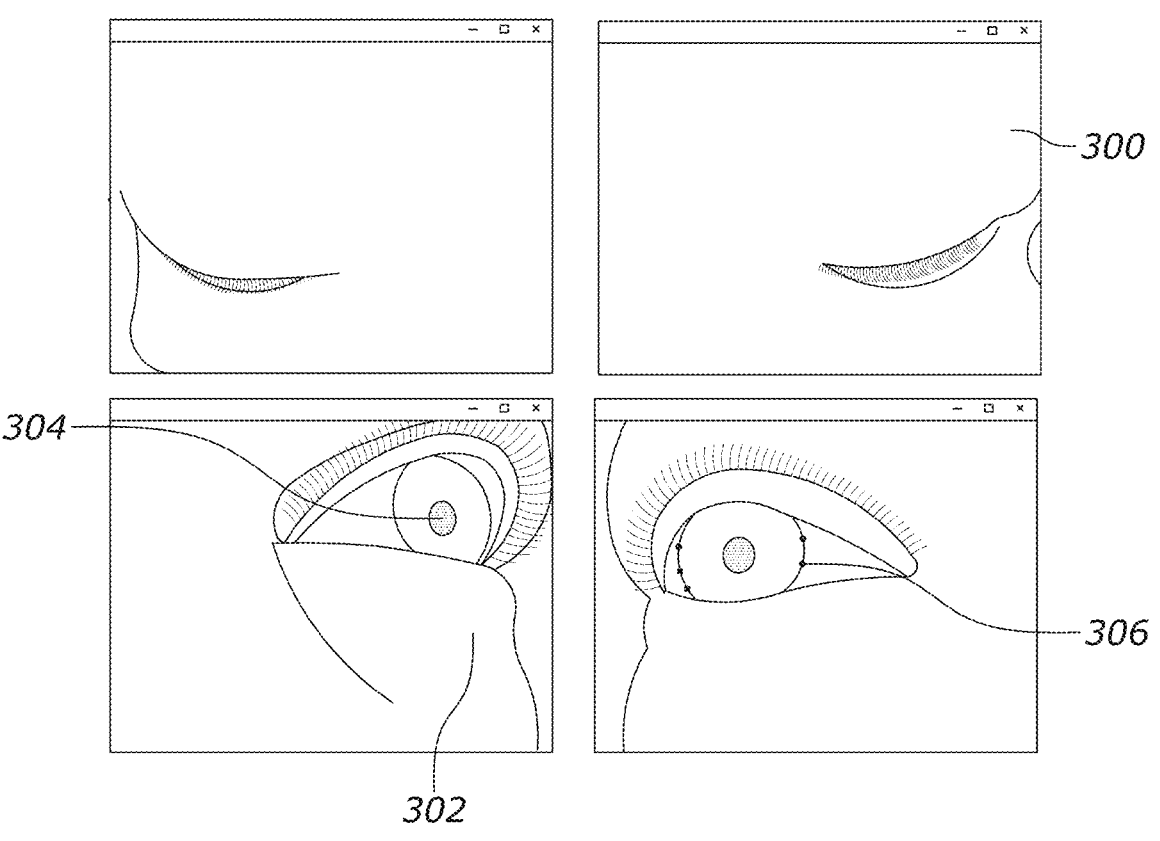
FIG. 3 illustrates four images of a human face.
Figure 4:
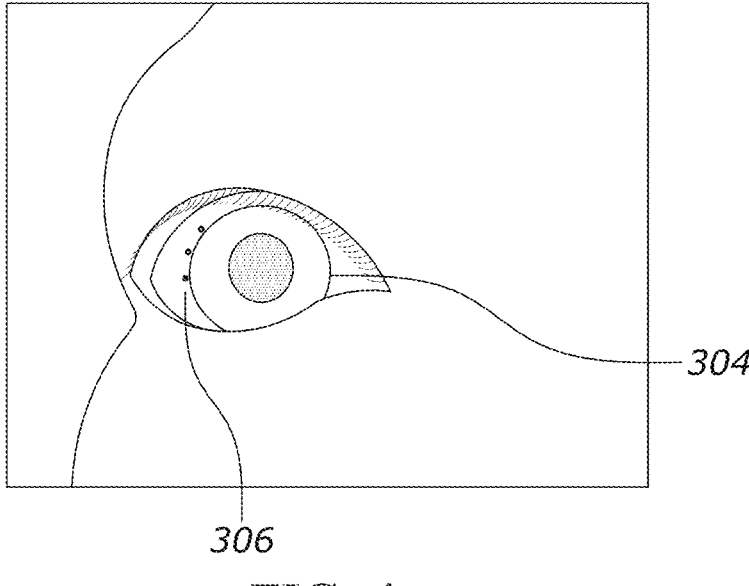
FIG. 4 illustrates details of a human eye exhibiting glint from illumination light sources such as but not limited to light emitting diodes (LEDs) in a HMD.

FIG. 3 illustrates portions of a person's face that are imaged for face tracking when the person is wearing the headset 200. The portions can include the eyebrows 300, cheekbones 302, and other facial features. Also, the eyes 304 of the person can be tracked by using, among other features, glints 306, which are reflections by the eye of light from the LEDs. FIG. 4 shows another view of the person's eye 304 with glints 306.

Figure 5:
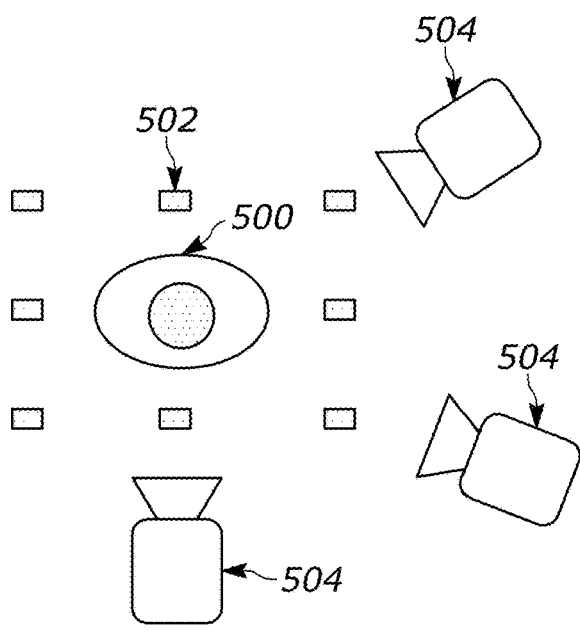
FIG. 5 illustrates a simplified HMD.

FIG. 5 illustrates a schematic diagram showing the eye 500 of a person wearing the headset 200 along with plural light sources 502 and cameras 504.

Figure 6:
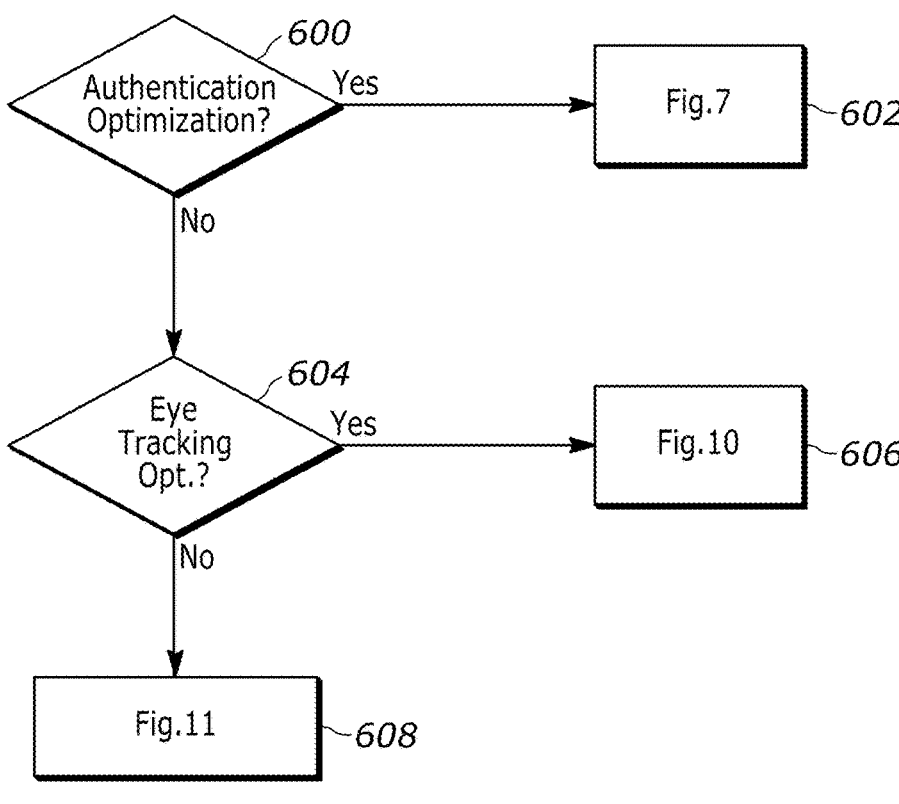
FIG. 6 illustrates example initial logic in example flow chart format.

FIG. 6 illustrates principles above in which the particular light sources used in the headset, their brightness, and if desired camera exposure are tailored for the particular purpose and particular use case. If it is determined at decision diamond 600 that authentication is to be executed, the logic moves to block 602 to resort to the technique of FIG. 7. On the other hand, if eye tracking is to be executed as determined at state 604, the logic moves to state 606 to implement the technique of FIG. 10. Or, if the task to be executed is face tracking, the logic can move to block 608 to implement the technique of FIG. 11.

Figure 7:
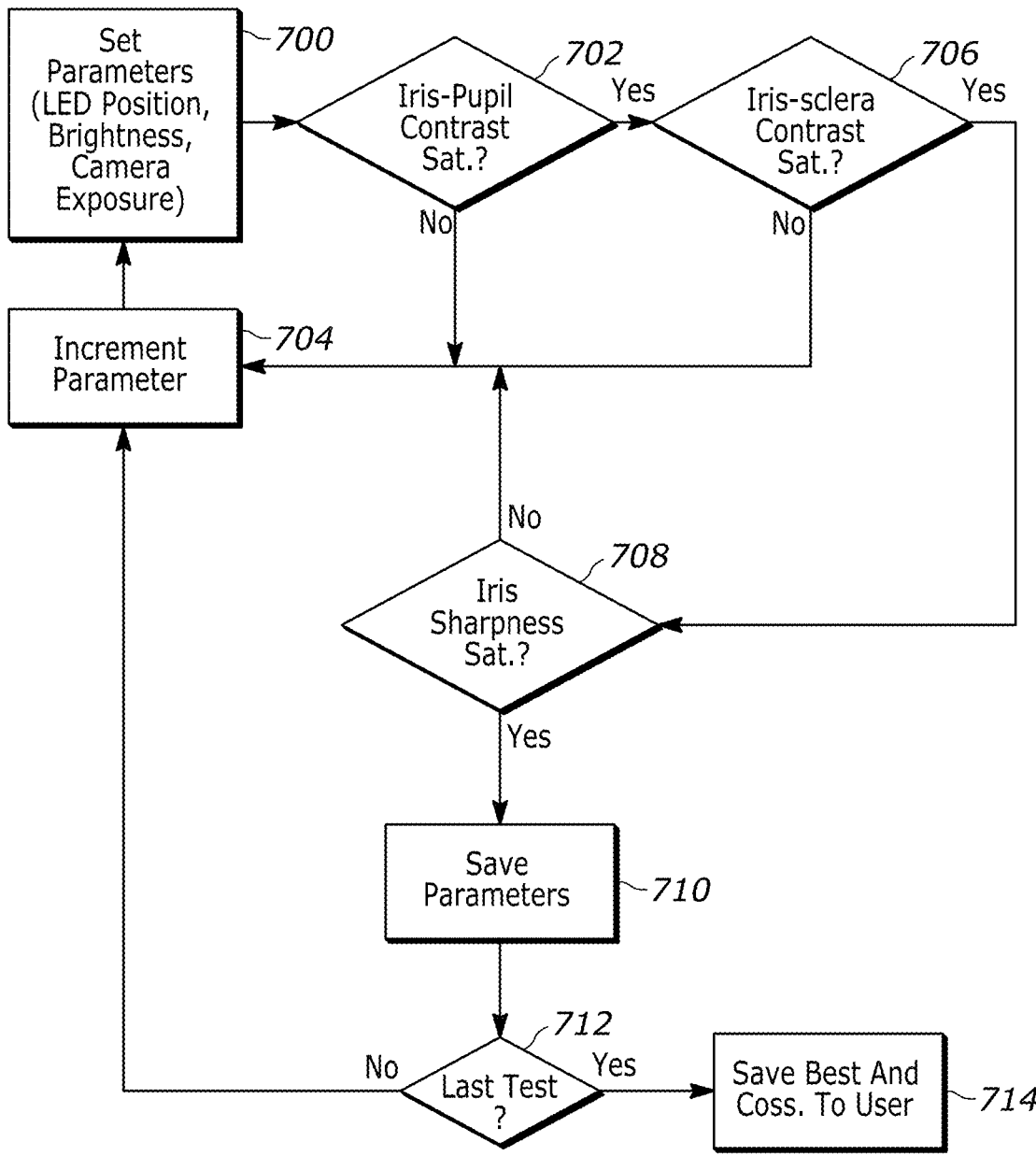
FIG. 7 illustrates example authentication logic in example flow chart format.

Turning now to FIGS. 7-9 and commencing at state 700 in FIG. 7, initial parameters are set for the headset 200 for the authentication test. For instance, if the user is identified, the last parameters set for that user may be established. The parameters include which LEDs are energized and at what brightnesses, as well as the exposure set for each camera as illustrated in FIG. 8, which indicates devices in the left column 800 and the parameter for each device in the corresponding second column 802. As indicated in the third column 804, the parameter to be set for each LED is brightness, and for authentication it is desired that no more than ten light sources (LEDs) be used to illuminate the eye. The third column 804 also indicates that the exposure for each camera should be no more than one millisecond.

Moving to decision diamond 702, it is determined, for the current set of parameters, whether iris-pupil contrast as detected from the images from one or more of the headset cameras satisfactorily achieves a target, such as a minimum of 30% contrast. This test is indicated in the first row 900 of FIG. 9. If this test fails, the logic moves to state 704 in FIG. 7 to increment one or more parameters, e.g., to increase or decrease by a unit or by N units, wherein N is an integer, the brightness of one or more of the LEDs, and/or to increase or decrease which LEDs are used and/or to increase or decrease camera exposure. The tests are then repeated at block 700 by taking new images of the eyes under conditions of the new parameter(s).

On the other hand, if the first test passes the logic can move from state 702 to state 706 for a second test, in the example shown, whether iris-sclera contrast satisfies a threshold, e.g., 5%. This is illustrated in the second row 902 of FIG. 9. If not, the logic can move to block 704 to change one or more parameters and re-test at block 700. However, if the second test passes yet a third test may be performed at state 708, in the example shown, whether iris sharpness is satisfactory. This is reflected in the third row 904 of FIG. 9. As shown in FIG. 9, each of the tests above may be executed for the same set of parameters multiple times, one time for each camera image.

Should all three tests pass, the logic may save the current set of parameters at block 710. If all tests have been executed as determined at decision diamond 712 the best set of parameters passing all three tests may be saved and designated as such at block 714 for use of those parameters in conducting authentication of the particular user, who is correlated with the parameters. If more tests require execution, the logic loops from decision diamond 712 to block 704 to adjust parameters and determine if a better set of parameters exists.

Note that all parameter combinations (LED positions plus brightness plus exposure) if a test algorithm such as generalized reduced gradient is used, which can effectively search and find the best conditions with a minimum number of trials. As an example, If the camera takes pictures of the eye at one hundred twenty frames per second (120 FPS) and the number of conducted trials is sixty, the optimization completes in a half second. The algorithm can optimize the parameters under constraint conditions so that it can maximize and balance the targets in a short time without any over exposure/under exposure.

Figure 10:
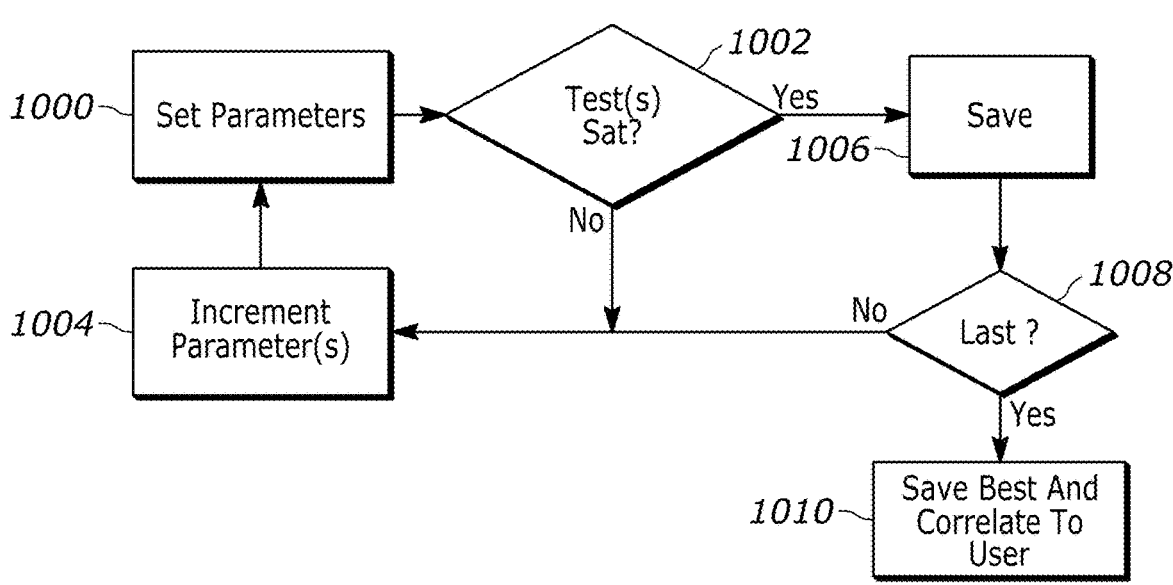
FIG. 10 illustrates example eye tracking logic in example flow chart format.
Figure 11:
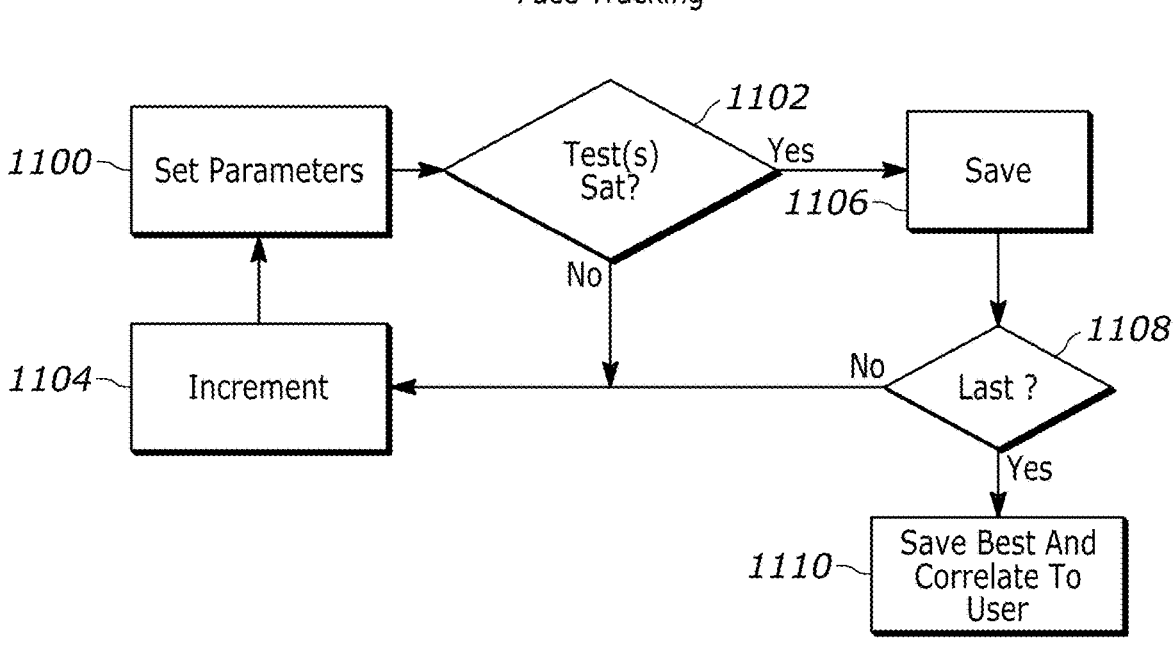
FIG. 11 illustrates example face tracking logic in example flow chart format.

As alluded to above, FIGS. 10 and 11 illustrate eye tracking optimization and face tracking optimization, respectively. Parameters as discussed above are set at block 1000 and one or more tests conducted at state 1002 appropriate for eye tracking optimization, e.g., a minimum number of glints and/or glint sharpness may be used. If a set of parameters does not pass a test the logic moves to block 1004 to increment one or more parameters and conduct another trial at block 1000. If the test(s) pass the currently implemented parameters are saved at state 1006. If all trials have been completed at state 1008 the set of parameters currently set are saved at block 1010 and correlated to the user, for imposition of the parameters for eye tracking should a game engine for instance request eye tracking information of the wearer of the headband 200.

In FIG. 11 parameters as discussed above are set at block 1100 and one or more tests conducted at state 1102 appropriate for face tracking optimization, e.g., a minimum contrast between the brows and the cheeks may be used. If a set of parameters does not pass a test the logic moves to block 1104 to increment one or more parameters and conduct another trial at block 1100. If the test(s) pass the currently implemented parameters are saved at state 1106. If all trials have been completed at state 1108 the set of parameters currently set are saved at block 1110 and correlated to user, for imposition of the parameters for eye tracking should a game engine for instance request eye tracking information of the wearer of the headband 200.

Figure 12:
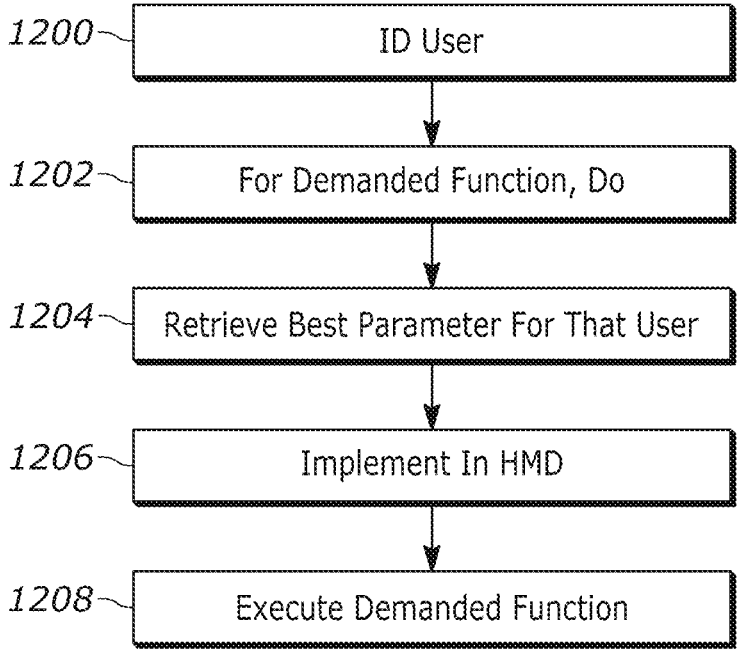
FIG. 12 illustrates example use logic in example flow chart format.

FIG. 12 illustrates use of the above techniques. A user of the headband 200 may be identified at block 1200 by login, biometric identification including face recognition, etc. Then, a demanded function is received. For the demanded function (eye tracking, face tracking, or authentication), a DO loop is entered at block 1300 in which the parameters optimized for that user and function are retrieved at block 1204 and implemented (set) into the headband 200 at block 1206 by, e.g., appropriately illuminated the optimal LEDs at the optimal brightness levels for imaging by one or more cameras having the optimal exposures. The demanded function is then executed at block 1208.

Figure 13:
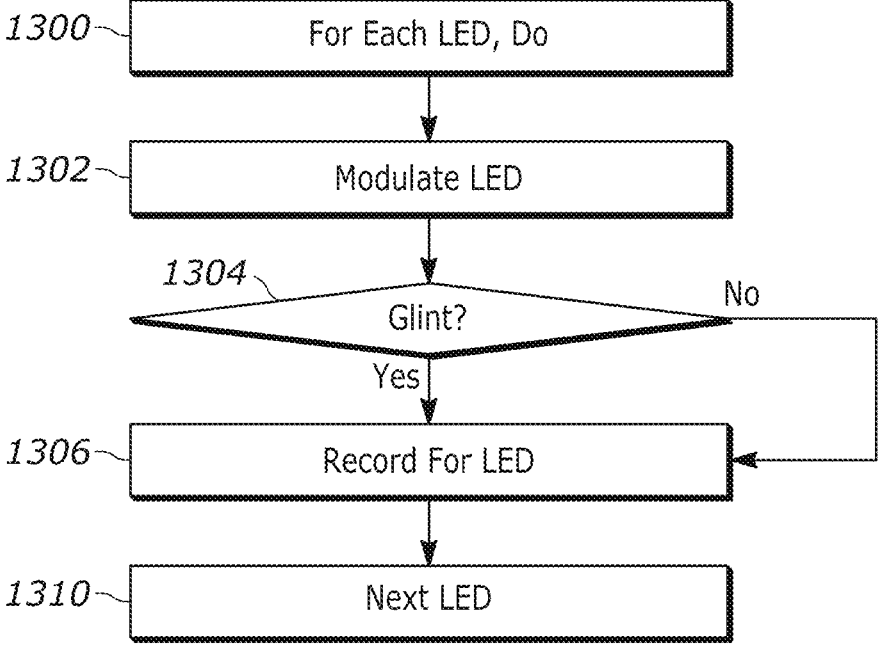
FIG. 13 illustrates example logic for noting which LEDs generate glint of the eye of a user, in example flow chart format.
Figure 14:
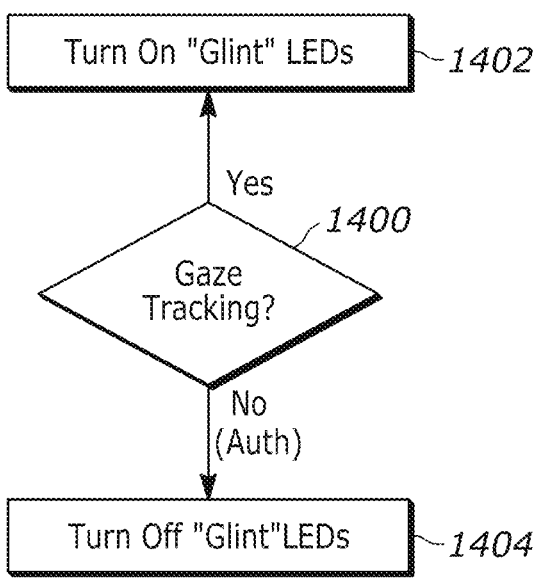
FIG. 14 illustrates use logic in example flow chart format for using the outcome of FIG. 13.
Figure 15:
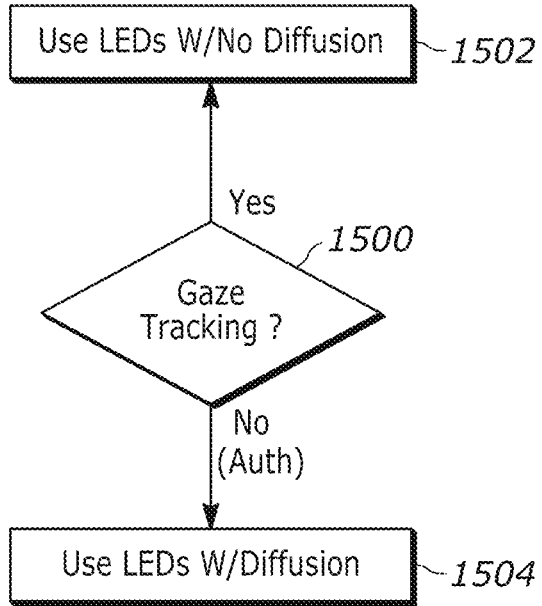
FIG. 15 illustrates example LED diffusion selection logic in example flow chart format.

FIGS. 13-15 illustrate additional techniques that can be used in lieu of or in addition to any other technique herein. Commencing at block 1500 in FIG. 15, for each LED in the headset 200, the single LED may be modulated at block 1502 with the other LEDs deenergized and the eyes of the wearer imaged to determine if the particular LED under test resulted in one or more glints from the eye at state 1304. The presence or absence of a glint is recorded for that LED at block 1304 and then the next LED is tested at block 1310.

Moving to FIG. 14, when gaze tracking is demanded at state 1400, the LEDs that resulted in glints as recorded at block 1306 in FIG. 13 are energized at block 1402. However, when a function or task other than gaze tracking is demanded, e.g., authentication using iris images, the LEDs resulted in glints as recorded at block 1306 in FIG. 13 are deenergized at block 1404.

A related technique is shown in FIG. 15. Responsive to gaze tracking being demanded at state 1500, at block 1502 LEDs are used to illuminate the eye without any diffusion. For instance, the diffuser 208 of an LED 204 in FIG. 2 may be moved out of the way, or an LED in the headset without any diffuser stationed in front of it may be used to illuminate the eye. On the other hand, when a function or task other than gaze tracking is demanded, e.g., authentication using iris images, at block 1504 LEDs are energized to direct light through a diffuser to illuminate the eye at block 1504.

While the particular embodiments are herein shown and described in detail, it is to be understood that the subject matter which is encompassed by the present invention is limited only by the claims.

What is claimed is:

1. A system comprising:

a memory comprising computer-executable instructions; and a processor configured to access the memory and execute the computer-executable instructions to perform operations comprising:

establish a first set of parameters in a head-mounted device (HMD) for a first function; and establish a second set of parameters in the HMD for a second function, wherein the first set of parameters and the second set of parameters comprise at least a light source for illuminating an eye of a wearer of the HMD and an identity of which light sources in the HMD to use, and wherein the first function comprises authentication.

2. The system of claim 1, wherein the second function comprises eye tracking.

3. The system of claim 1, wherein the second function comprises face tracking.

4. The system of claim 1, wherein the first set of parameters and second set of parameters comprise exposure time of at least one camera from whence the processor is configured to receive at least one image of the eye.

5. The system of claim 1, wherein the memory comprises additional computer-executable instructions and the processor is further configured to access the memory and execute the additional computer-executable instructions to perform additional operations comprising correlate the first and second parameters to a first user.

6. The system of claim 1, wherein the memory comprises additional computer-executable instructions and the processor is further configured to access the memory and execute the additional computer-executable instructions to perform additional operations comprising:

selecting at least one of the first set of parameters or the second set of parameters to implement in the HMD based on a demanded function; and executing the demanded function.

7. The system of claim 1, wherein the memory comprises additional computer-executable instructions and the processor is further configured to access the memory and execute the additional computer-executable instructions to perform additional operations comprising:

responsive to a demand for eye tracking, illuminating at least a first light source of the light source that causes a glint from an eye; and responsive to a demand for authentication, illuminating at least a second light source of the light source that causes no glint from the eye.

8. The system of claim 1, wherein the memory comprises additional computer-executable instructions and the processor is further configured to access the memory and execute the additional computer-executable instructions to perform additional operations comprising:

responsive to a demand for eye tracking, illuminating at least a first light source of the light source with no light diffuser positioned between the first light source and an eye; and responsive to a demand for authentication, illuminate at least a second light source of the light source with at least one light diffuser positioned between the second light source and the eye.

9. An apparatus comprising:

a memory comprising computer-executable instructions; and a processor configured to access the memory and execute the computer-executable instructions to perform operations comprising:

identify parameters for a headset for an authentication test;

determine for the parameters whether iris-pupil contrast as detected from one or more images from one or more cameras of the headset satisfies a first test;

responsive to iris-pupil contrast failing to satisfy the first test, modify one or more parameters and re-determining whether iris-pupil contrast satisfies the first test;

determine whether iris-sclera contrast satisfies a second test;

responsive to iris-sclera contrast failing to satisfy the second test, modify one or more parameters and re-determining whether iris-sclera contrast satisfies the second test;

determine whether iris sharpness satisfies a third test;

responsive to iris sharpness failing to satisfy the third test, modify one or more parameters and re-determining whether iris sharpness satisfies the third test; and responsive to the first, second, and third tests being satisfied, use a current set of parameters to conduct authentication of a user.

10. The apparatus of claim 9, wherein the parameters comprise which lamps in the headset are energized.

11. The apparatus of claim 10, wherein the parameters comprise brightnesses of the lamps.

12. The apparatus of claim 9, wherein the parameters comprise an exposure set for at least one camera in the headset.

13. The apparatus of claim 9, wherein the first test comprises a minimum amount of contrast between iris and pupil.

14. The apparatus of claim 9, wherein the second test comprises a minimum amount of contrast between iris and sclera.

15. A computer-implemented method comprising:

executing A, or B, or A and B, wherein:

A comprises:

responsive to a demand for eye tracking, illuminating at least a first light source that causes a glint from an eye; and responsive to a demand for authentication, illuminating at least a second light source that causes no glint from the eye; and B comprises:

responsive to the demand for eye tracking, illuminating at least a first light source with no light diffuser positioned between the first light source and an eye; and responsive to the demand for authentication, illuminating at least a second light source with at least one light diffuser positioned between the second
        light source and the eye.

16. The method of claim 15, further comprising executing A.

17. The method of claim 15, further comprising executing B.

18. The method of claim 15, further comprising executing A and B.

19. The method of claim 15, further comprising:

establishing a first set of parameters in a head-mounted device (HMD) for a first function; and establishing a second set of parameters in a head-mounted device (HMD) for a second function, wherein at least one the first parameters or second set of parameters comprise at least a light source for illuminating an eye of a wearer of the HMD and an identity of which light sources in the HMD to use, and wherein the first function comprises gaze tracking.

20. The method of claim 15, further comprising:

establishing a first set of parameters in a head-mounted device (HMD) for a first function; and establishing a second set of parameters in a head-mounted device (HMD) for a second function, wherein at least one the first parameters or second set of parameters comprise at least a light source for illuminating an eye of a wearer of the HMD and an identity of which light sources in the HMD to use, and wherein the first function comprises authentication.

\* \* \* \* \*